Figure 1:
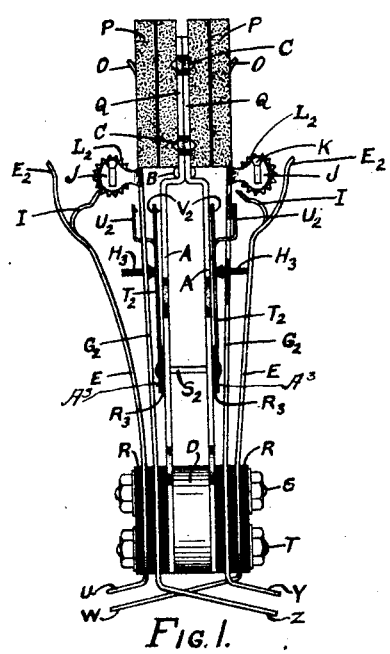

No. 802,939. PATENTED OCT. 24, 1905.
F. R. PARKER.
GROUND PLATE FOR ELECTRIC PROTECTIVE APPARATUS.
APPLICATION FILED NOV. 26, 1904.

WITNESSES:
H. B. Hall
F. W. Pardee

INVENTOR:
Frederick R. Parker.

UNITED STATES PATENT OFFICE.

FREDERICK R. PARKER, OF CHICAGO, ILLINOIS, ASSIGNOR TO FRANK B. COOK, OF CHICAGO, ILLINOIS.

GROUND-PLATE FOR ELECTRIC PROTECTIVE APPARATUS.

No. 802,939.      Specification of Letters Patent.      Patented Oct. 24, 1905.

Original application filed July 9, 1904, Serial No. 215,933. Divided and this application filed November 26, 1094. Serial No. 234,401.

*To all whom it may concern:*

Be it known that I, FREDERICK R. PARKER, a citizen of the United States, residing at Chicago, in the county of Cook and State of Illinois, have invented new and useful Improvements in Ground-Plates for Electric Protective Apparatus, of which the following is a full, clear, concise, and exact description, reference being had to the accompanying drawings, forming a part of this specification.

This application is a division of my application for patent on electric protective apparatus filed July 9, 1904, Serial No. 215,933.

My invention relates to apparatus used in connection with protective devices for electrical circuits, my object being, first, to simplify such apparatus; second, to provide an improved form of ground-plate in such apparatus on which the protector-springs and protective devices are mounted, and, third, to provide an economical, efficient, and durable construction in such apparatus which may be readily and cheaply manufactured.

The apparatus of this invention is for the purpose of supporting and operating two classes of electric protective devices—namely, those which protect electrical circuits and apparatus from high-tension electric discharges, such as lightning, and those which protect the said circuits and apparatus from small "sneak-currents." The high-tension electric discharges are guarded against by means of lightning-arresters, preferably consisting of carbon blocks with interposed dielectrics, and the sneak-currents are guarded against by means of heat-coils or thermal protectors.

This apparatus comprises spring-supports provided with suitable contacts and arranged for holding the lightning-arresters and heat-coils, the said springs being suitably mounted on a plate which is preferably secured to an iron supporting-frame and conductively connected to earth. When this apparatus is used in connection with telephone systems to provide protection therefor, the said springs form terminals for the lines, switchboard and alarm-circuits. When a thermal protector operates, it throws a ground on certain springs of the combination and controls an alarm-circuit and a switchboard-circuit. I also provide means whereby a testing-plug may be used in connection with the protective apparatus for testing the several circuits therethrough.

I will now describe my invention in detail by reference to the accompanying sheet of drawings, illustrating same, in which—

Figure 2:
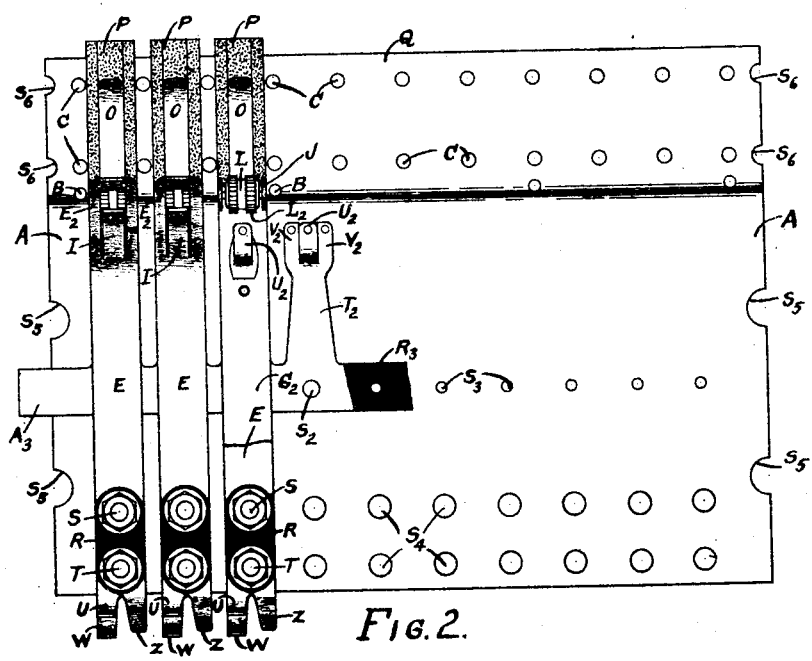

Figure 1 is a plan view of a duplicate set of the protective apparatus mounted on opposite sides of the ground-plate, and Fig. 2 is a side elevation of a ground-plate and a series of sets of protective apparatus mounted thereon with certain parts removed.

Like characters refer to like parts in both figures.

The supportnig-plate upon which the protective apparatus is mounted is composed of two metal strips A A, preferably of brass, preferably riveted together at B and formed substantially as shown. Each strip A is provided with projecting points C C thereon, formed out of the strip and adapted to hold the lightning-arresters P P in place therebetween against said strip. This said mounting-plate is adapted to carry a series of sets of the protective apparatus and is preferably grounded through the iron framework of a distributing-board or the like. The usual form of supporting-plate for protective apparatus now in use is a solid iron bar of considerable thickness, about three-eighths of an inch, to one edge of which is secured a thin strip for supporting the lightning-arresters. This form of plate is very heavy and contains much unnecessary material. The strips A A of my present invention are very thin, preferably .032 of an inch, and are formed so as to take the place of both the said usual supporting-plate and strip secured thereto, thus simplifying the construction and doing away with the larger part of the material and weight of the solid-bar form. Another advantage of my strip A over the solid bar is that the latter has to be drilled wherever a hole therethrough is required, while all of the holes of my strip A may be punched. This is a considerable saving in the manufacture of my ground-plate A A. The plate A A may be nickel-plated over the surfaces against which the lightning-arresters rest or where contact-points make contact to insure good contact with the contacting parts. Strips A A are similar, thus making the mounting-plate reversible.

The protective devices and spring members of the protective apparatus are mounted in a series of duplicate sets upon the ground-plate A A, each duplicate set forming a pair and the sets of each pair being mounted on opposite sides of the said plate directly opposite each other. As the duplicate sets of apparatus of the series are similar to each other, I will describe in detail one duplicate set only of the series.

On each side of the ground-plate A A is mounted a pair of springs E and $G^2$ by two double-ended bolts S and T, which extend through the strips A A near the rear edge of the latter. These springs E and $G^2$ are mounted flatwise on the said strips and are insulated from each other and from the said strips by suitable insulating bushings and washers R R, threaded on the bolts S and T. I preferably place a bushing D on the said bolts between the strips A A, so that when the nuts on S and T are screwed up tightly the strips A A will be rigidly held at a given distance from each other. Each spring $G^2$ is provided with ears J J thereon, between which a heat-coil or thermal protector L is placed and held by the spring-pressure of the said ears and with a narrow portion O at the free end thereof adapted to fit in a groove of a lightning-arrester P, and thereby hold same in place against the strip Q. Springs $G^2 G^2$ terminate in suitable connection-terminals Y and Z, respectively, and are preferably to be connected with the line conductors of a metallic line—as, for example, the limbs of a telephone-line. Each spring E is provided with a tongue I, near its free end, adapted to engage a thermal protector L at the teeth $L^2$ thereof. Springs E E terminate in suitable connection-terminals U and W, respectively, and are preferably to be connected with the conductors of a metallic circuit leading to a central-station switchboard.

The alarm-strip $A^3$, which I preferably employ, is made of a very thin strip of metal one side of which is punched so as to provide a series of projecting portions $T^2$ thereon. Each projecting portion $T^2$ is split at its free end and a portion thereof turned up, as at $U^2$, thus providing two contact portions $V^2 V^2$ on the straight part of $T^2$ and a contact $U^2$ on the turned-up portion thereof. I mount one of the alarm-strips $A^3$ flatwise on each side of the ground-plate A A, preferably by bolts or rivets $S^2$, extending through the plate A A and holes of the alarm-strips, and insulate the latter from the plate A A by respective insulating-strips $R^3 R^3$. Each contact $U^2$ of alarm-strip $A^3$ extends freely through a hole in a line-spring $G^2$ and is normally out of contact with the latter. Contacts $V^2 V^2$ are also normally out of contact with ground-strip A, as shown upon the left-hand side of Fig. 1. I prefer this form of arrangement for closing an alarm-circuit over an individual spring for each set of the protective apparatus, as it does away with many separate parts and eliminates the necessity of connecting the alarm-springs together by a common conductor, as is usually done. With this arrangement I employ only two individual springs in each set of the protective apparatus for supporting the protective devices, for operating the thermal protector and controlling the several circuits, for testing purposes, and for the connection-terminals, whereas it is the usual practice to employ five or six individual springs in each set of the protective apparatus for accomplishing all of these purposes.

The circuit from a switchboard conductor to a corresponding line conductor through the protective apparatus is from connection-terminal U through switchboard-spring E, tongue I, thermal protector L, ears J J, line-spring $G^2$, and connection-terminal Z, or through a similar circuit on the opposite side of plate A.

If a high-potential electric current or discharge, such as lightning, comes to the protective apparatus from a line conductor, it will pass through a connection-terminal Z or Y, and a line-spring $G^2$ and then jump through a lightning-arrester P from one carbon to the other to the ground-strip Q and thence to earth, thus dissipating its energy without injuring the thermal protector L or the switchboard-circuit and apparatus connected thereto.

When an abnormally large current with insufficient voltage to arc through the lightning-arrester—this current being generally termed a "sneak-current"—traverses the circuit through a thermal protector L for a short length of time—say from fifteen seconds to one minute, depending upon the strength of the current—it heats the protector L, and thereby allows the spring member I to operate L in any suitable manner and release itself therefrom to take the position shown on the right of Fig. 1, due to the tension in springs E and I, and thereby open the circuit through the thermal protector L. When spring E is thus operated, it causes the insulating-pin $H^3$ to press against the alarm-spring $T^2$, and thereby depress the latter until contacts $V^2 V^2$ thereof engage the ground-strip A, and contact $U^2$ thereof engages the line-spring $G^2$, thereby grounding the line-spring $G^2$ and switching the abnormal current from the line to earth and also closing the alarm-circuit at $V^2 V^2$ to operate the alarm, which indicates that a protective device has operated. It will be seen that the switchboard-circuit is now cut off from the line-circuit and is therefore protected from the abnormal line-current. When the protective device has cooled sufficiently (if a "self-soldering" device) or has been replaced by a new device, the spring member I may be again engaged with the said device, as shown upon the left of Fig. 1, which engagement restores the protective apparatus to its initial operative position.

I have preferably shown a thermal protector or heat-coil L of the self-soldering type, which is provided with a series of teeth therearound adapted to turn upon an axis when a fusible material normally holding the teeth against rotation is softened by an abnormal current traversing the said protector; but I do not wish to limit this invention to this particular thermal protector.

I preferably transpose certain of the connection-terminals to opposite sides of the mounting-plate A A by bending same as shown at W and Z, thereby putting both switchboard-terminals U and W on one side of the said plate and both line-terminals Y and Z on the opposite side of the said plate. It has been the usual practice heretofore when it was desired to transpose the connection-terminals to connect the spring members to be transposed with respective auxiliary connection-terminals on opposite sides of the mounting-plate from the said springs, either by soldering separate conductors from each spring to a corresponding terminal or through the mounting-bolts which were properly insulated from each other and from the said plate, the latter being so thick that it was not thought to be practicable to make the transpositions as I do in my present invention. These methods necessitated many extra parts, such as terminals, insulating-bushings, and washers. In my present invention I do away with all of these extra parts by placing the mounting-strips A A considerably closer together than the ordinary thickness of said solid mounting-plates, and thereby reduce the lengths of the connection-terminals sufficiently to render it practicable to bend and arrange the said terminals as herein shown. With this arrangement and the decrease in the number of springs per set from the number of springs generally used to accomplish all of the purposes of my invention it will be seen that the construction of the apparatus is greatly simplified.

In this invention I do not employ any extra contact members to form switches for a test-plug, nor do I remove any of the circuit-protectors from their supports in testing the several circuits through the apparatus. I simply employ the line-springs and switchboard-springs and the protective devices themselves, substantially as shown and described in my application for Letters Patent on electric protective apparatus filed July 9, 1904, Serial No. 215,933.

While I have shown and described particular details of construction in this invention, I do not wish to limit same to such exact details, as slight modifications in certain parts of the structure would not be a departure from the scope of the invention. Neither do I wish to limit myself to any particular type of thermal protector or lightning-arrester.

Having thus described my invention, what I claim as new, and desire to secure by Letters Patent, is—

1. In electric protective apparatus, a supporting-plate comprising thin metal strips secured together at one edge and spaced from each other at the opposite edge, and suitable protector-springs and protective devices mounted on the said plate upon opposite sides thereof.

2. In apparatus of the class specified, a mounting-plate composed of two thin metal strips secured together at an edge portion thereof and spaced from each other over the remainder of same to form a hollow portion, lightning-arresters suitably mounted along the said edge portion, and protective apparatus suitably mounted upon the said hollow portion.

3. In apparatus of the class specified, a ground-plate comprising thin sheet-metal strips held parallel to and at a given distance from each other, over the body of the plate to form a hollow portion, and secured together at an edge portion to form a flange, projecting points on the flange portion formed out of the said strips, lightning-arresters held in place against the said flange, and suitable protective apparatus mounted on the hollow portion of the plate upon opposite sides thereof.

4. A mounting-plate for electric protective apparatus, comprising two "Z-bars," a flange of one bar being held against a flange of the other bar to form a thin tongue portion along one edge of the plate, the other flanges of the bars being secured at a uniform given distance from each other and parallel with and opposite to one another, lightning-arresters mounted against the said tongue portion, and sets of protector-springs mounted upon the shell portion of the said plate.

5. A sheet-metal ground-plate for electric protective apparatus, a transverse cross-section of which is in the form of three sides of a hollow rectangle with a flange portion extending from one end thereof, and series of protector-springs and protective apparatus suitably mounted upon the said ground-plate.

6. A sheet-metal ground-plate for mounting protective apparatus thereon, the body of which comprises two parallel portions held at a given distance from each other, a flange extending from one edge of said plate and being a continuation of the said parallel portions held against each other, a distance-piece at the opposite edge of said plate between said parallel portions, suitable mounting-bolts extending through the said parallel portions, a pair of springs for each side of said plate and mounted upon said bolts, lightning-arresters for each side of said flange and suitably held thereto, and a protective device for each pair of springs and in circuit with same.

7. A sheet-metal ground-plate for mounting protective apparatus thereon, the body of which comprises two parallel portions suitably held at a given distance from each other, a flange extending from one edge of said plate and being a continuation of said parallel portions held against each other, projecting points on said flange and formed out of the latter, and lightning-arresters suitably held against said flange between said projections.

8. A sheet-metal ground-plate for mounting protective apparatus thereon, comprising two parallel portions suitably held at a given distance from each other and united at one edge, and a flange extending from said edge and being a continuation of said parallel portions held against each other, projecting points on each side of said flange and formed out of the latter, and series of lightning-arresters suitably mounted against said flange, on each side thereof, between the said projecting points.

As inventor of the foregoing I hereunto subscribe my name, in the presence of two subscribing witnesses, this 22d day of November, A. D. 1904.

FREDERICK R. PARKER.

Witnesses:
F. W. Pardee,
Jno. F. Tompkins.